Aug. 12, 1941.                T. R. LUZZATI                2,252,467
                    PROJECTOR FOR STEREOSCOPIC IMAGES
                        Filed July 25, 1938        2 Sheets-Sheet 1

T. R. Luzzati
Inventor

By Glascock Downing & Seebold
Attys.

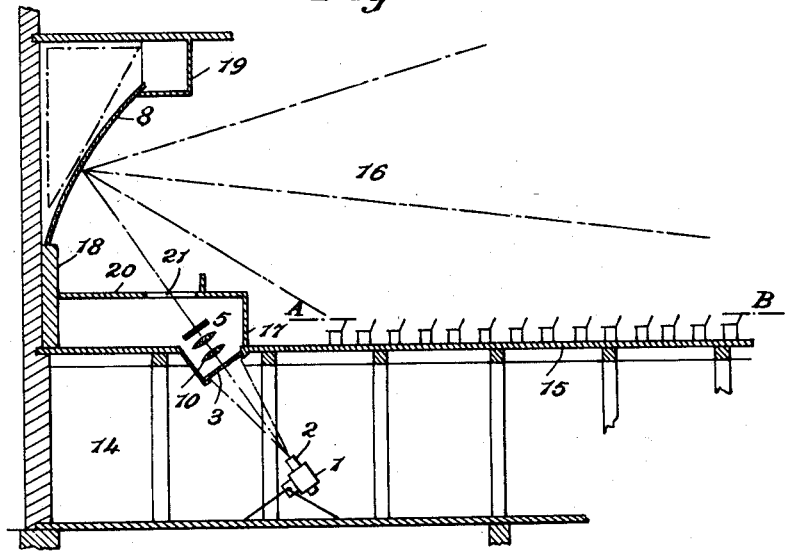
Fig. 4
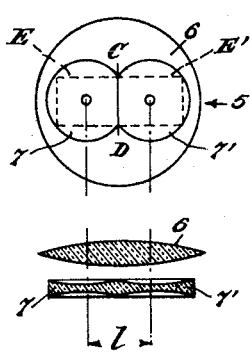
Fig. 5
Fig. 5a.
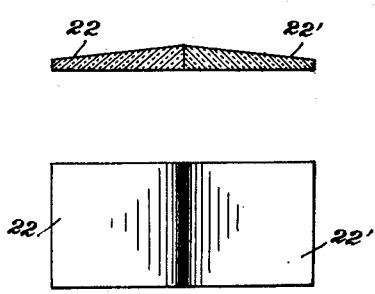
Fig. 6
Fig. 6a.

Patented Aug. 12, 1941

2,252,467

UNITED STATES PATENT OFFICE 2,252,467

PROJECTOR FOR STEREOSCOPIC IMAGES

Tommaso Riccardo Luzzati, Siena, Italy

Application July 25, 1938, Serial No. 221,214
In Italy August 7, 1937

2 Claims. (Cl. 88—16.6)

The object of the present invention is an apparatus for projecting stationary and moving stereoscopic images and for viewing same at a distance with the naked eye.

The apparatus consists of an image projector with a lamp or chamber for projecting combined stereoscopic images and if necessary, also a small screen is used upon which the images are projected and also a system of lenses co-operating with said screen consisting of at least one positive and two negative lenses each of which co-operates with a different area of the positive lens and eventually with a second one which is more remote from the first optical system and which preferably consists of a spherical or parabolic reflector.

An object of the invention is to provide means for adjusting the image reflected from the second optical system (the spherical reflector) so that it may be seen by all the spectators who may be seated in any geometrical position, for example in the seats of a theatre or in a plane parallel with the floor of the theatre, or in the tri-dimensional space of a room etc., in a period of time less than that necessary for forming the persistence of the image on the retina of the human eye.

In the accompanying drawings,

Fig. 1 shows a schematic arrangement according to the invention, for viewing stereoscopically reflected stationary or moving images on a concave reflector with the naked eye.

Fig. 2 also shows a schematic arrangement as in Fig. 1 but with an additional position lens which collects the image for the concave reflector.

Fig. 4 shows an elevation of a cinema theatre equipped with the apparatus according to the invention.

Figure 1:
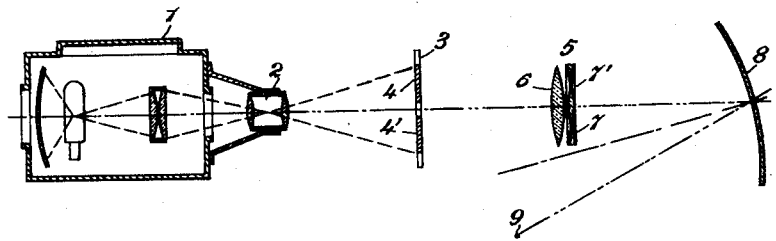
Figure 2:
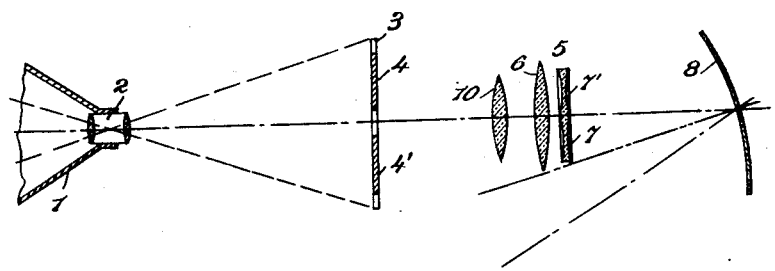
Figure 3:
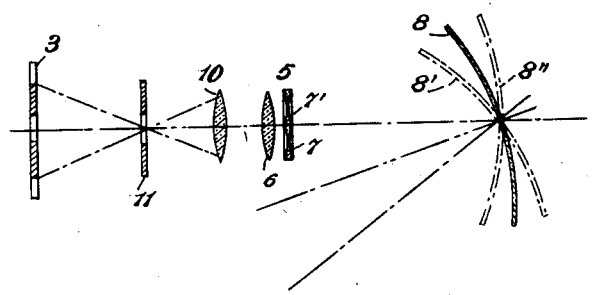
Fig. 3 shows an arrangement as in Fig. 2 but with the addition of means for adjusting the image reflected from the concave reflector so that it may be seen equally by all spectators from any particular geometrical position.

Figs. 5 and 5a are an elevation and sectional view, respectively, of a part of the lens system of the arrangement according to Figs. 1, 2 and 3 but on an enlarged scale, and Figs. 6 and 6a show, in section and plan, a modification of Fig. 5.

In Fig. 1 of the drawings, 1 indicates a projecting apparatus of a known type but with the difference that the image strip is printed with double stereoscopic images so that it projects a pair of images 4 and 4' through the lens system 2 on to the small screen 3. These images are reversed as compared with those viewed through the usual stereoscopes i. e., with the right image on the left and the left image on the right. The actual images 4 and 4' collected by the small transparent image screen 3 are then passed to the lens system 5 which consists of a large positive lens 6 and a pair of negative lenses 7 and 7'. The images thrown by the lenses 7 and 7' are reflected by the concave reflector 8 and may be viewed by an observer located at the point 9.

Preferably the concave reflector 8 is so arranged that its axis cuts the angle formed by the sight line of the observer at 9 and the projecting line of the lens system 5 into two equal parts.

When the observer at 9 looks at the concave reflector 8, he sees a single combined image of apparently greater dimensions than the concave reflector 8. When the observer moves his head he can also see two non-combined images at the sides of the first image which obviously have to be rendered invisible whilst the picture or the like is being shown.

Fig. 2, in which like numerals indicate like parts, shows a positive lens 10 inserted between the screen 3 and the lens system 5, the object of which is to fix the stereoscopically combined image which the observer at 9 sees in the concave reflector 8 and to keep the above mentioned side images outside the reflector. In other words, so that either a vertical or a horizontal movement of the observer's head does not result in a displacement of the main image when it is viewed in the concave reflector 8.

In Fig. 3, the concave reflector 8 is movable so that it may be moved into the position 8' or 8'' thus reflecting the rays in various directions so that the various observers seated in a room may see the combined image in the concave reflector 8. The movements between the position 8' and 8'' must be effected within a period of time which is not longer than the usual period for the persistence of the image on the retina of the human eye and preferably this movement is made simultaneous with the movement of the light images so that the extreme positions 8' and 8'' of the concave reflector correspond with the intervals when the images are concealed.

So as to avoid overlapping of the images caused by the compound image, an intermediate screen 11 is provided having an adjustable central aperture and which is placed at the intersection of the light rays between the small transparent image screen 3 and the fixing lens 10.

By way of example Fig. 4 shows schematically the apparatus according to the invention adapted for a cinema theatre in which the projecting apparatus 1 is located in a chamber 14 e. g. under the floor 15 of the theatre 16. The image is projected on to the small transparent image screen 3 and through a lens system 2. The stereoscopic or combining lens system 5 equipped with a collecting lens 10 and vanes is concealed from the observers by means of a partition 17. The concave reflector 8 is mounted at an angle in a suitable swivelling carrier frame such as the frame 18 and 19 which is preferably of rectangular or square shape. A stage 20 may be used with an opening for the passage of the image rays and which can be closed when the stage is used for purposes other than that of picture projection.

Obviously non-stereoscopic films can also be projected with the apparatus according to the invention in which case the lens system is not used.

The lens system 5 is shown in greater detail in Fig. 5 where the positive lens is indicated by 6 and the negative lenses by 7 and 7' and the axes of the latter lenses are at a distance $l$ from one another.

The system according to Fig. 5 may consist of a pair of prisms 22 and 22'.

As may be seen from Fig. 5, the diameter of the lenses 7 and 7' is greater than the axial distance $l$ and they are cut along the line C—D and assembled so as to give a rectangular effective field E and E' for the stereoscopic image whilst the remaining parts of the lens system 5 are covered in the known manner by suitable opaque intermediate partitions.

The invention has been described with reference to several non-obligatory examples because several structural modifications can be applied within the scope of the invention. For example, the above mentioned screen may be dispensed with and the image projected by the apparatus (also for example the television arrangement) may be collected directly by the optical system 6, 7, 7' or 8 and 10. Furthermore the moving arrangement for the concave reflector may be replaced by any other means for the purpose of suitably shifting the light rays.

Having now particularly described and ascertained the nature of my said invention and in what manner the same is to be performed, I declare that what I claim is:

1. An apparatus for projecting stationary and moving stereoscopic images comprising a small screen, means for projecting separate real images of the members of a stereoscopic pair of pictures on said screen side by side, a lens system including at least one positive lens and two like negative lenses having their adjacent edges coaxial with the positive lens to project and convert said real images into a stereoscopic combined image, and a substantially concave reflector screen arranged to reflect said combined image, said lens system comprising a collecting lens arranged between the screen and the reflector, and an intermediate partition provided with an adjustable central aperture for the passage of light rays to prevent the stereoscopic images from overlapping.

2. An apparatus as claimed in claim 1, characterized by the provision of an exhibition chamber, the reflector being situated in said exhibition chamber at the approximate location of the usual projection screen, the projecting means, screen and lens system being arranged below the line of vision of the observers.

TOMMASO RICCARDO LUZZATI.